(12) United States Patent
Lin

(10) Patent No.: US 8,426,731 B2
(45) Date of Patent: Apr. 23, 2013

(54) PHOTOVOLTAIC BATTERY MODULE AND JUNCTION BOX ASSEMBLY THEREIN

(75) Inventor: Chih-Hsin Lin, Xianxi Township, Changhua County (TW)

(73) Assignee: K.S. Terminals Inc., Changhua County (TW)

( * ) Notice: Subject to any disclaimer, the term of this patent is extended or adjusted under 35 U.S.C. 154(b) by 390 days.

(21) Appl. No.: 12/963,782

(22) Filed: Dec. 9, 2010

(65) Prior Publication Data

US 2012/0012383 A1  Jan. 19, 2012

(30) Foreign Application Priority Data

Jul. 14, 2010  (TW) .............................. 99213454 U

(51) Int. Cl.
*H05K 5/00* (2006.01)
*H01H 9/02* (2006.01)
*H02B 1/30* (2006.01)
*H01R 13/502* (2006.01)

(52) U.S. Cl.
USPC ................. 174/50; 174/58; 174/63; 174/559; 174/560

(58) Field of Classification Search ..................... 174/50, 174/58, 63, 520, 559, 560
See application file for complete search history.

(56) References Cited

U.S. PATENT DOCUMENTS

| | | | | | |
|---|---|---|---|---|---|
| 6,166,321 | A | * | 12/2000 | Sasaoka et al. | ............... 136/251 |
| 7,626,118 | B1 | * | 12/2009 | Capozzi | ........................... 174/50 |
| 2006/0180196 | A1 | * | 8/2006 | Lares et al. | .................... 136/251 |
| 2008/0156514 | A1 | * | 7/2008 | Webb | .............................. 174/58 |
| 2009/0107693 | A1 | * | 4/2009 | Meyer | .............................. 174/60 |
| 2010/0252098 | A1 | * | 10/2010 | Cohen et al. | .................. 136/256 |

* cited by examiner

*Primary Examiner* — Timothy Thompson
*Assistant Examiner* — Sherman Ng
(74) *Attorney, Agent, or Firm* — Ming Chow; Sinorica, LLC

(57) ABSTRACT

Disclosed are a photovoltaic battery module and a junction box assembly. The junction box assembly comprises a junction box and a base plate assembled with the junction box. The junction box comprises an insulated housing, the conductive terminals and the water-resistant members. The bottom of the junction box disposes the first openings. The water-resistant members disposed at the first openings have second openings whose areas are smaller than those of the first opening. The base plate disposes the third openings whose areas are smaller than those of the first opening. The third openings are assembled with the first openings and the second openings. Pairs of wing portions provided with a first preset distance, which is shorter than the width of the junction box, are aligned at both lateral sides of the base plate. The average width of the base plate is not greater than 50 millimeter.

18 Claims, 3 Drawing Sheets

PHOTOVOLTAIC BATTERY MODULE AND JUNCTION BOX ASSEMBLY THEREIN

BACKGROUND OF THE INVENTION

1. Technical Field

The present invention relates to a photovoltaic battery module, and more particularly, to a photovoltaic battery module and junction box assembly therein 2. Description of Related Art In recent years, non-renewable energy sources have been in short supply throughout the world, with many industries regarding solar cells as a priority. Current trends in energy savings are looking to the integration of solar cell with building materials and glass, such as the replacement of rooftop materials with solar cells, attaching solar cells to the external walls of buildings and to cover windows, skylights and. Unfortunately, a single solar cell can generate only a small electric current, so multiple solar cells are often connected via a junction box in parallel or series so as to give out a relatively large voltage and current. Generally, the solar cell module comprising multiple solar cells and a junction box is provided for meeting the overall power-generating efficiency to the general usage.

The solar cells and the junction boxes are often installed outdoors or are mounted on the roof, therefore the solar cells and the junction boxes are constantly exposed to severe outdoor conditions, and factors such as high temperature and temperature change can cause the junction boxes breakdown or damaged. Moreover, the attachment between the junction box and the solar cells is easily to loosen, thereby affecting the stability of conducting electricity. Furthermore, at the sites where the solar cells and junction boxes are attached, due to the weather and other factors, water is likely to permeate into the solar cells. This can make the solar cells breakdown. More particularly, since the volume of the junction box mounted on the window frames or the glass curtains is pretty small, the contact area between the junction box and the window frames or the glass curtains is small too. Therefore, the attachment between the junction box and the window frames or the glass curtains is not secure enough, which causes the junction box loosened from the window frames or the glass curtains, thereby making the junction box breakdown or damaged.

SUMMARY OF THE INVENTION

To overcome the shortcomings of the prior arts mentioned above, the present invention provides a junction box assembly. The junction box assembly comprises a junction box and a base plate, wherein the junction box is assembled with the base plate. The junction box comprises an insulated housing and a pair of conductive terminals disposed in the insulated housing. The junction box and the base plate both include a longitudinal axis. The bottom of the junction box disposes at least two first openings along the longitudinal axis. The junction box further comprises at least two water-resistant members, each of the water-resistant members, which is disposed at each of the first openings, has a second opening, wherein the area of each of the second openings is smaller than the area of each of the first openings.

The base plate is of a bar shape and disposes at least two third openings along the longitudinal axis. Each of the third openings each of the first openings of the junction box and each of the second openings of each of the water-resistant members are assembled with one another. The area of each of the third openings is smaller than the area of each of the first openings. A plurality of pairs of wing portions are aligned along both lateral sides of the longitudinal axis of the base plate. Each of the pair of wing portions is provided with a first preset distance there between. The first preset distance is shorter than the width of the junction box. The average width of the base plate is not greater than 50 millimeter.

Accordingly, the primary object of the present invention is to provide a junction box assembly comprising a junction box and a base plate, wherein the junction box assembly is formed via the assembly between the bottom of the junction box and the base plate. Specifically, the average width of the base plate of the junction box assembly is not greater than 50 millimeter (mm) and is accordingly suitable for a junction box of small volume. Hence, the contact area between the junction box assembly and the desired mounted regions, for example, the window frames or the glass curtains, is remarkably enhanced, thereby ensuring the junction box assembly being firmly mounted on the desired regions and being unlikely to loosen.

Another object of the present invention is to provide a junction box assembly, in which a plurality of pairs of wing portions are aligned along both lateral sides of the longitudinal axis of the base plate. Each of the pair of wing portions is provided with a first preset distance there between. Particularly, the first preset distance is shorter than the width of the junction box. Accordingly, the junction box, when being assembled with the base plate, the insulated housing of the junction box can be clamped tightly via each of the pair of wing portions of the base plate. Hence, the junction box can be securely assembled with the base plate, which is unlikely to loosen or be taken apart due to external impact or unintentional force.

Yet another object of the present invention is to provide a junction box assembly, in which a plurality of pairs of wing portions are aligned along both lateral sides of the longitudinal axis of the base plate. Each of the pair of wing portions is provided with a first preset distance there between. Moreover, each of the pair of wing portions has a pair of hook structures at their distal ends. Each of the pair of hook structures is provided with a second preset distance there between. Particularly, the second preset distance is smaller than aforementioned first preset distance. Accordingly, each of the pair of hook structures of each of the pair of wing portions can retain the junction box at the position being above the junction box. Hence, the junction box of the present invention can be more securely assembled with the base plate, which is unlikely to loosen or be taken apart due to external impact or unintentional force.

Still another object of the present invention is to provide a junction box assembly, wherein the base plate of the junction box assembly has a recessed portion corresponding in the assembling position to the junction box of the junction box assembly. Each of the third openings of the base plate is formed on the recessed portion. Accordingly, the junction box, when being assembled with the base plate, can be retained firmly via the recessed portion of the base plate. The base plate of the present invention that has the pair of wing portions, the pair of hook structures and the recessed portion not only makes the junction box more securely assembled with the base plate, but also makes the attachment between the junction box assembly and the desired mounted regions thereon, for example, the window frames or the glass curtains, being unlikely to loosen or be taken apart due to external impact or unintentional force from different directions.

Still another object of the present invention is to provide a junction box assembly, in which the junction box of the junction box assembly further comprises at least two water-resistant members. Each of the water-resistant members, which is disposed at each of the first openings, respectively, has a second opening. Moreover, the base plate further comprises at least two flanges. Each of the third openings is formed centrally at each of the flanges. Accordingly, each of the flanges of the base plate penetrates into each of the second openings of each of the water-resistant members, thereby improving the junction box assembly of the present invention in better water-proof performance.

Moreover, the present invention provides a photovoltaic battery module
comprising at least one photovoltaic battery and a junction box assembly, wherein the features of the junction box assembly are substantially the same as those above-mentioned in the present invention.

Accordingly, still another object of the present invention is to provide a photovoltaic battery module comprising a junction box and a base plate, wherein the junction box assembly is formed via the assembly between the bottom of the junction box and the base plate. Specifically, the average width of the base plate of the junction box assembly is not greater than 50 millimeter (mm) and is accordingly suitable for a junction box of small volume. Hence, the contact area between the junction box assembly and the desired mounted regions, for example, the window frames or the glass curtains, is remarkably enhanced, thereby ensuring the junction box assembly being firmly mounted on the desired regions and being unlikely to loosen.

Still another object of the present invention is to provide a photovoltaic battery module, in which a plurality of pairs of wing portions are aligned along both lateral sides of the longitudinal axis of the base plate. Each of the pair of wing portions is provided with a first preset distance there between. Particularly, the first preset distance is shorter than the width of the junction box. Accordingly, the junction box, when being assembled with the base plate, the insulated housing of the junction box can be clamped tightly via each of the pair of wing portions of the base plate. Hence, the junction box can be securely assembled with the base plate, which is unlikely to loosen or be taken apart due to external impact or unintentional force.

Still another object of the present invention is to provide a photovoltaic battery module, in which a plurality of pairs of wing portions are aligned along both lateral sides of the longitudinal axis of the base plate. Each of the pair of wing portions is provided with a first preset distance there between. Moreover, each of the pair of wing portions has a pair of hook structures at their distal ends. Each of the pair of hook structures is provided with a second preset distance there between. Particularly, the second preset distance is smaller than aforementioned first preset distance. Accordingly, each of the pair of hook structures of each of the pair of wing portions can retain the junction box at the position being above the junction box. Hence, the junction box of the present invention can be more securely assembled with the base plate, which is unlikely to loosen or be taken apart due to external impact or unintentional force.

Still another object of the present invention is to provide a photovoltaic battery module, wherein the base plate of the junction box assembly has a recessed portion corresponding in the assembling position to the junction box of the junction box assembly. Each of the third openings of the base plate is formed on the recessed portion. Accordingly, the junction box, when being assembled with the base plate, can be retained firmly via the recessed portion of the base plate. The base plate of the present invention that has the pair of wing portions, the pair of hook structures and the recessed portion not only makes the junction box more securely assembled with the base plate, but also makes the attachment between the junction box assembly and the desired mounted regions thereon, for example, the window frames or the glass curtains, being unlikely to loosen or be taken apart due to external impact or unintentional force from different directions.

Still another object of the present invention is to provide a photovoltaic battery module, in which the junction box of the junction box assembly further comprises at least two water-resistant members. Each of the water-resistant members, which is disposed at each of the first openings, respectively, has a second opening. Moreover, the base plate further comprises at least two flanges. Each of the third openings is formed centrally at each of the flanges. Accordingly, each of the flanges of the base plate penetrates into each of the second openings of each of the water-resistant members, thereby improving the junction box assembly of the present invention in better water-proof performance.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Some particular embodiments of the invention will be described in detail for purpose of illustration, and one of ordinary skill in the art can easily understand the advantages and efficacy of the present invention through the disclosure of the specification. It is to be understood that alternative embodiments may be possible for the implement and application of the present invention while numerous variations will be possible to the details disclosed in the specification on the strength of diverse concepts and applications without going outside the scope of the invention as disclosed in the claims.

Figure 1:
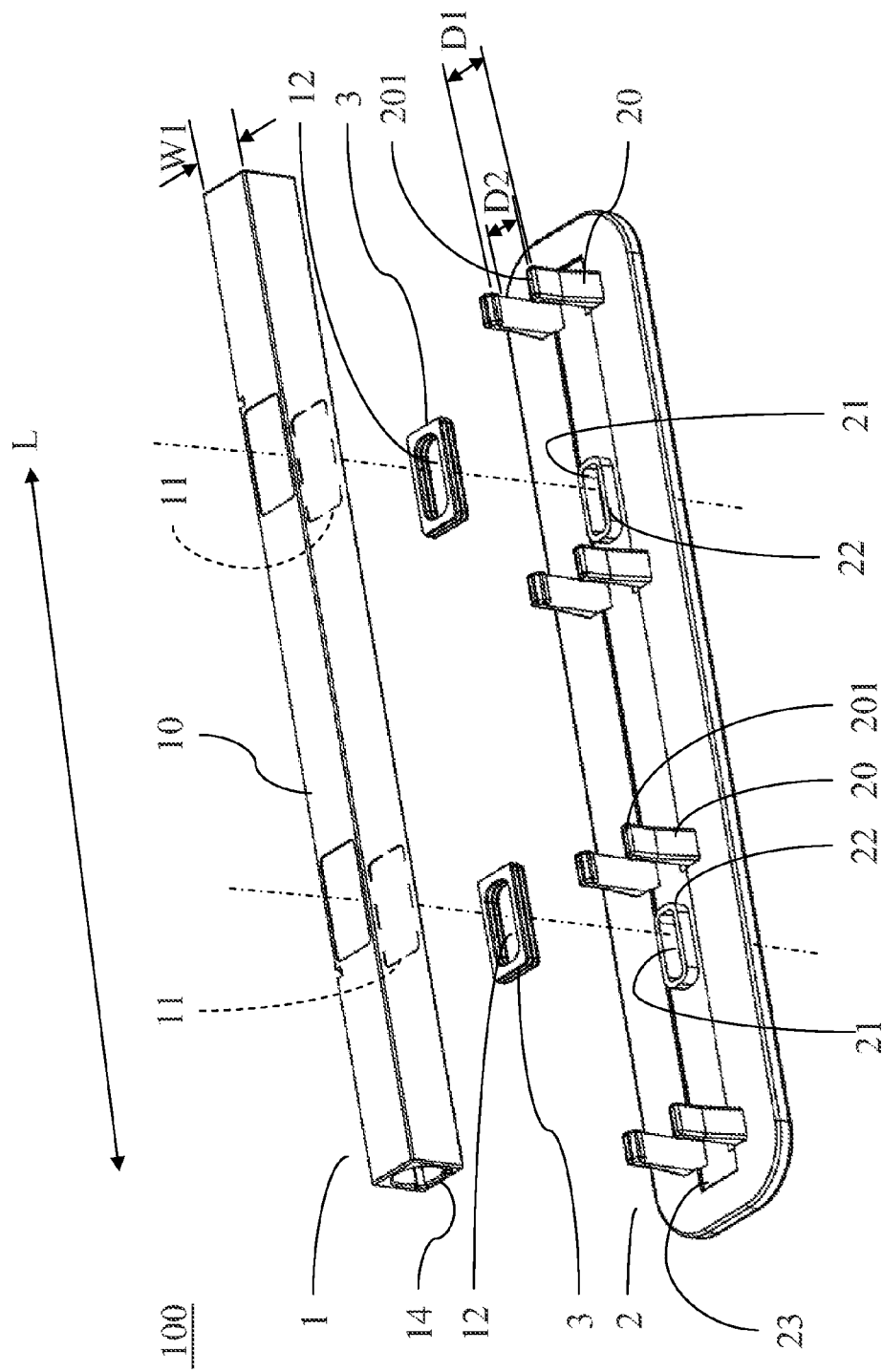
FIG. 1 is an exploded view of a junction box assembly according to the first preferred embodiment of the present invention.

Referring to FIG. 1, the first preferred embodiment of the present invention is a junction box assembly 100. This junction box assembly 100 comprises a junction box 1 and a base plate 2, wherein the junction box 1 is assembled with the base plate 2. Particularly, the base plate 2 is used for ensuring the junction box 1 being firmly mounted on the desired regions, for example, the window frames or the glass curtains. The junction box 1 comprises an insulated housing 10 and a pair of conductive terminals (not shown). The pair of conductive terminals (not shown) disposed in the insulated housing 10 allows the ribbon electrode of the photovoltaic battery (not shown in FIG. 1) to be inserted thereto so as to conduct electricity. The junction box 1 has a longitudinal axis L. The bottom 14 of the junction box 1 disposes at least two first openings 11 along aforementioned longitudinal axis L. In addition, the junction box 1 further comprises at least two water-resistant members 3. Each of the water-resistant members 3, which is disposed at each of the first openings 11, respectively, has a second opening 12. Accordingly, an area of each of the second openings 12 is smaller than an area of each of the first openings 11.

The base plate 2 also has a longitudinal axis L which is substantially the same as that of the junction box 1. The base plate 2 is of a bar shape and disposes at least two third openings 21 along aforementioned longitudinal axis L. Each of the third openings 21 is corresponding in position to each of the first openings 11 of the junction box 1 and each of the second openings 12 of each of the water-resistant members 3. Besides, the area of each of the third openings 21 is smaller than the area of each of the first openings 11.

Figure 2:
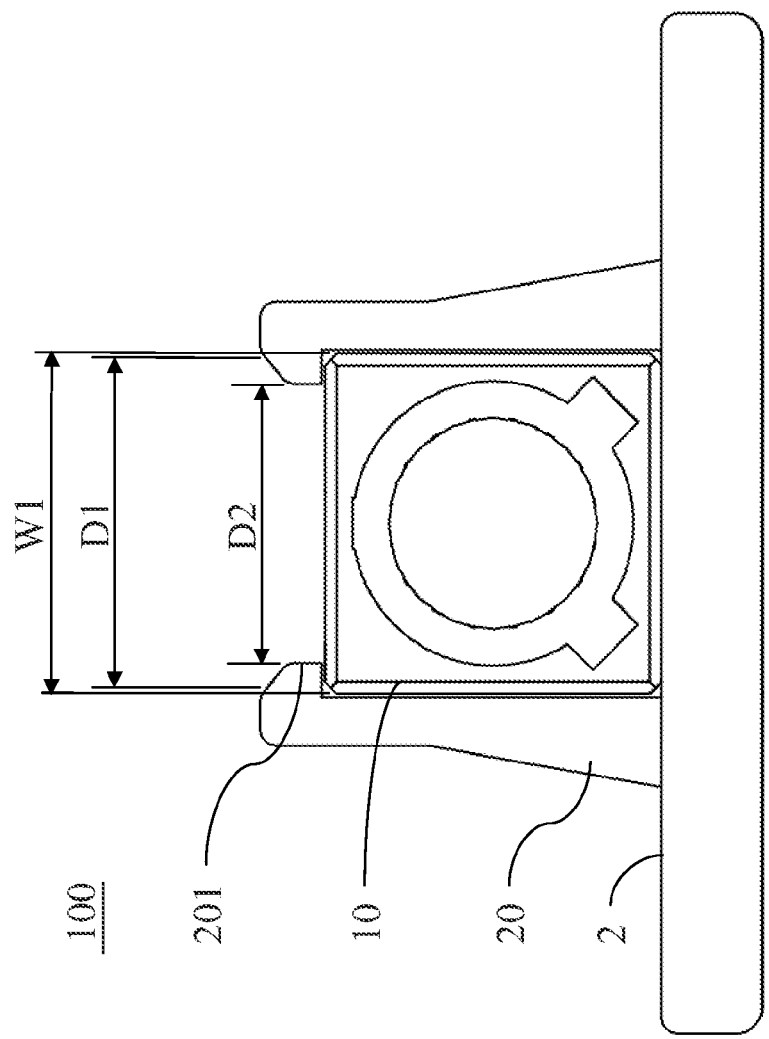
FIG. 2 is a front side view of a junction box assembly taken along the longitudinal axis according to the first preferred embodiment of the present invention.

Referring to FIG. 2, which is a front side view of the junction box assembly 100 taken along the longitudinal axis L according to the first preferred embodiment of the present invention. A plurality of pairs of wing portions 20 are aligned along both lateral sides of the longitudinal axis L of the base plate 2. Each of the pair of wing portions 20 is provided with a first preset distance D1 there between. Particularly, the first preset distance D1 is shorter than a width W1 of the junction box 1. Accordingly, the junction box 1, when being assembled with the base plate 2, the insulated housing 10 of the junction box 1 can be clamped tightly via each of the pair of wing portions 20 of the base plate 2 due to the fact that the first preset distance D1 is shorter than a width W1 of the junction box 1. Hence, the junction box 1 of the present invention can be securely assembled with the base plate 2, which is unlikely to loosen or be taken apart due to external impact or unintentional force. Moreover, each of the pair of wing portions 20 has a pair of hook structures 201 at their distal ends. Each of the pair of hook structures 201 is provided with a second preset distance D2 there between. Particularly, the second preset distance D2 is smaller than aforementioned first preset distance D1. Accordingly, the present invention can tightly clamp the junction box 1 via each of the pair of wing portions 20 of the base plate 2. Besides, each of the pair of hook structures 201 of each of the pair of wing portions 20 can retain the junction box 1 at the position being above the junction box 1. Hence, the junction box 1 of the present invention can be more securely assembled with the base plate 2. Particularly, the numbers of the pairs of wing portions 20 disposed on the base plate 2 are preferably, but not limited to, four pairs of wing portions 20. Furthermore, the height of each of the pair of wing portions 20 can be adjusted depending on the circumstances and the products required. Specifically, each of the pair of wing portions 20 of the first preferred embodiment of the present invention is higher than the junction box 1, thereby allowing each of the pair of wing portions 20 can retain the insulated housing 10 of the junction box 1 at the position being above the junction box 1.

More particularly, since the volume of the traditional junction box mounted on the window frames or the glass curtains is pretty small, the contact area between the traditional junction box and the window frames or the glass curtains is small too. Therefore, the attachment between the traditional junction box and the window frames or the glass curtains is not secure enough, which causes the traditional junction box loosened from the window frames or the glass curtains, thereby making the traditional junction box breakdown or damaged. However, the junction box assembly 100 of the present invention comprises a junction box 1 and a base plate 2, wherein the junction box 1 is assembled with the base plate 2. The area of the base plate 2 is bigger than that of the junction box 1, thereby remarkably enhancing the contact area between the junction box 1 and the desired mounted regions thereon, for example, the window frames or the glass curtains. Accordingly, the present invention is suitable for a junction box of small volume. Specifically, an average width of the base plate 2 of the junction box assembly 100 is not greater than 50 millimeter (mm) and is preferably 30 millimeter (mm).

Still referring to FIG. 1, the base plate 2 has a recessed portion 23 corresponding in the assembling position to the junction box 1. Each of the third openings 21 of the base plate 2 is formed on the recessed portion 23. Accordingly, the junction box 1, when being assembled with the base plate 2, can be retained firmly via the recessed portion 23 of the base plate 2. The base plate 2 of the present invention that has the pair of wing portions 20, the pair of hook structures 201 and the recessed portion 23 not only makes the junction box 1 more securely assembled with the base plate 2, but also makes the attachment between the junction box assembly 100 and the desired mounted regions thereon, for example, the window frames or the glass curtains, being unlikely to loosen or be taken apart due to external impact or unintentional force from different directions.

Moreover, still referring to FIG. 1, the base plate 2 further comprises at least two flanges 22. Each of the third openings 21 is formed centrally at each of the flanges 22. Accordingly, each of the flanges 22 of the base plate 2 penetrates into each of the second openings 12 of each of the water-resistant members 3, thereby improving the junction box assembly 100 of the present invention in better water-proof performance.

Figure 3:
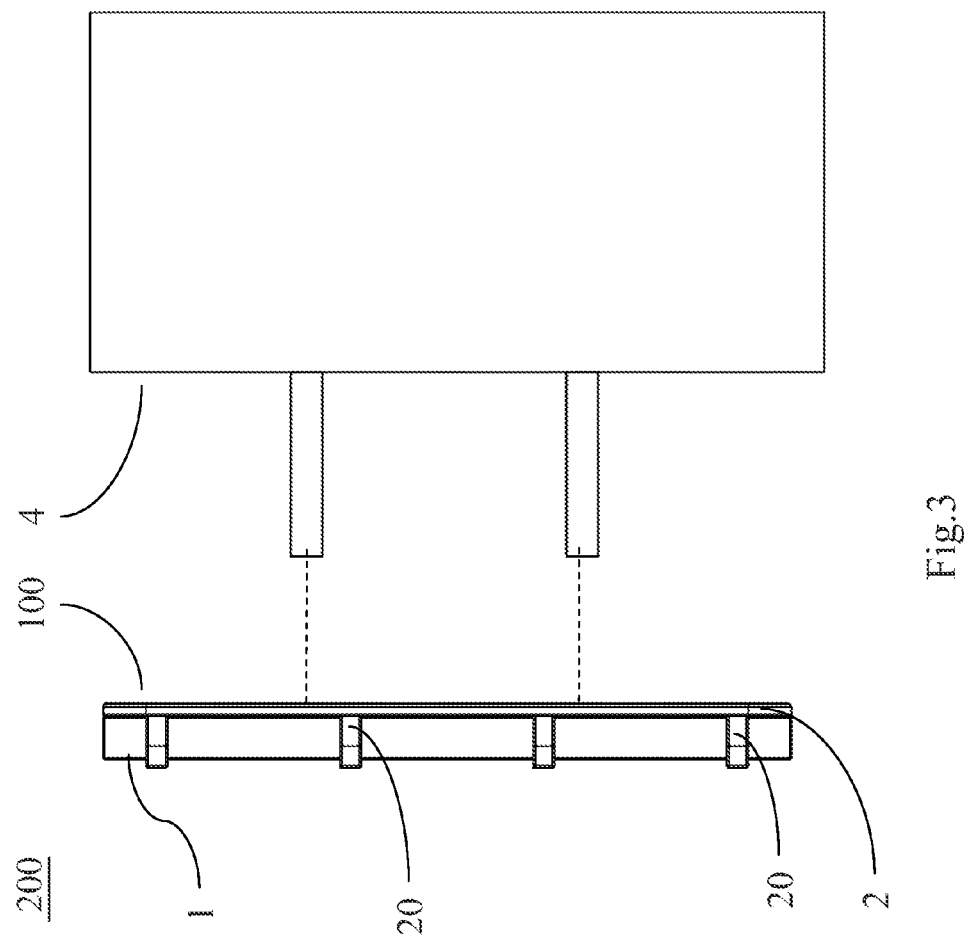
FIG. 3 is a top view of a photovoltaic battery module according to the second preferred embodiment of the present invention

Referring to FIG. 3, the second preferred embodiment of the present invention is a photovoltaic battery module 200. This photovoltaic battery module 200 comprises at least one photovoltaic battery 4 and a junction box assembly 100, wherein the features of the junction box assembly 100 are substantially the same as those described in the first preferred embodiment of the present invention. In this second preferred embodiment, via the base plate 2 of the junction box assembly 100, the contact area between the junction box assembly 100 and the desired mounted regions thereon, for example, the window frames or the glass curtains, is remarkably enhanced. Hence, the attachment of the junction box assembly 100 between the desired mounted regions, for example, the window frames or the glass curtains, is unlikely to loosen or be taken apart, thereby making the junction box assembly 100 not being breakdown or damaged and improving photovoltaic battery module 200 in service life.

Although some particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A junction box assembly, comprising a junction box (1) and a base plate (2), wherein the junction box (1) is assembled with the base plate (2), the junction box (1) comprising an insulated housing (10) and a pair of conductive terminals disposed in the insulated housing (10), the junction box (1) and the base plate (2) both including a longitudinal axis (L), the junction box assembly (100) being characterized in that:
   a bottom (14) of the junction box (1) disposes at least two first openings (11) along the longitudinal axis (L);
   the junction box (1) further comprises at least two water-resistant members (3), each of the water-resistant members (3), which is disposed at each of the first openings (11), has a second opening (12), wherein an area of each of the second openings (12) is smaller than an area of each of the first openings (11); and
   the base plate (2) is of a bar shape and disposes at least two third openings (21) along the longitudinal axis (L), each of the third openings (21) each of the first openings (11) of the junction box (1) and each of the second openings (12) of each of the water-resistant members (3) are assembled with one another, an area of each of the third openings (21) is smaller than an area of each of the first openings (11), a plurality of pairs of wing portions (20) are aligned along both lateral sides of the longitudinal axis (L) of the base plate (2), each of the pair of wing portions (20) is provided with a first preset distance (D1) there between, the first preset distance (D1) is shorter than a width (W1) of the junction box (1), an average width of the base plate (2) is not greater than 50 millimeter.

2. The junction box assembly of claim 1, wherein each of the pair of wing portions (20) has a pair of hook structures (201) at their distal ends.

3. The junction box assembly of claim 2, wherein each of the pair of hook structures (201) is provided with a second preset distance (D2) there between, the second preset distance (D2) being smaller than the first preset distance (D1).

4. The junction box assembly of claim 1, wherein the plurality of pairs of wing portions (20) is preferably four pairs of wing portions (20).

5. The junction box assembly of claim 1, wherein the base plate (2) further comprises at least two flanges (22), each of the third openings (21) being formed centrally at each of the flanges (22).

6. The junction box assembly of claim 5, wherein each of the flanges (22) penetrating into each of the second openings (12) of each of the water-resistant members (3).

7. The junction box assembly of claim 1, wherein the base plate (2) has a recessed portion (23) corresponding in position to the junction box (1).

8. The junction box assembly of claim 7, wherein each of the third openings (21) is formed on the recessed portion (23).

9. The junction box assembly of claim 1, wherein the average width of the base plate (2) is preferably 30 millimeter.

10. A photovoltaic battery module, comprising at least one photovoltaic battery (4) and a junction box assembly (100),
the junction box assembly (100) comprising a junction box (1) and a base plate (2), wherein the junction box (1) is assembled with the base plate (2), the junction box (1) comprising an insulated housing (10) and a pair of conductive terminals disposed in the insulated housing (10), the junction box (1) and the base plate (2) both including a longitudinal axis (L), the junction box assembly (100) being characterized in that:
a bottom (14) of the junction box (1) disposes at least two first openings (11) along the longitudinal axis (L);
the junction box (1) further comprises at least two water-resistant members (3), each of the water-resistant members (3), which is disposed at each of the first openings (11), has a second opening (12), wherein an area of each of the second openings (12) is smaller than an area of each of the first openings (11); and
the base plate (2) is of a bar shape and disposes at least two third openings (21) along the longitudinal axis (L), each of the third openings (21) each of the first openings (11) of the junction box (1) and each of the second openings (12) of each of the water-resistant members (3) are assembled with one another, an area of each of the third openings (21) is smaller than an area of each of the first openings (11), a plurality of pairs of wing portions (20) are aligned along both lateral sides of the longitudinal axis (L) of the base plate (2), each of the pair of wing portions (20) is provided with a first preset distance (D1) there between, the first preset distance (D1) is shorter than a width (W1) of the junction box (1), an average width of the base plate (2) is not greater than 50 millimeter.

11. The photovoltaic battery module of claim 10, wherein each of the pair of wing portions (20) has a pair of hook structures (201) at their distal ends.

12. The photovoltaic battery module of claim 11, wherein each of the pair of hook structures (201) is provided with a second preset distance (D2) there between, the second preset distance (D2) being smaller than the first preset distance (D1).

13. The photovoltaic battery module of claim 10, wherein the plurality of pairs of wing portions (20) is preferably four pairs of wing portions (20).

14. The photovoltaic battery module of claim 10, wherein the base plate (2) further comprises at least two flanges (22), each of the third openings (21) being formed centrally at each of the flanges (22).

15. The photovoltaic battery module of claim 14, wherein each of the flanges (22) penetrating into each of the second openings (12) of each of the water-resistant members (3).

16. The photovoltaic battery module of claim 10, wherein the base plate (2) has a recessed portion (23) corresponding in position to the junction box (1).

17. The photovoltaic battery module of claim 16, wherein each of the third openings (21) is formed on the recessed portion (23).

18. The photovoltaic battery module of claim 10, wherein the average width of the base plate (2) is preferably 30 millimeter.

* * * * *